UNITED STATES PATENT OFFICE.

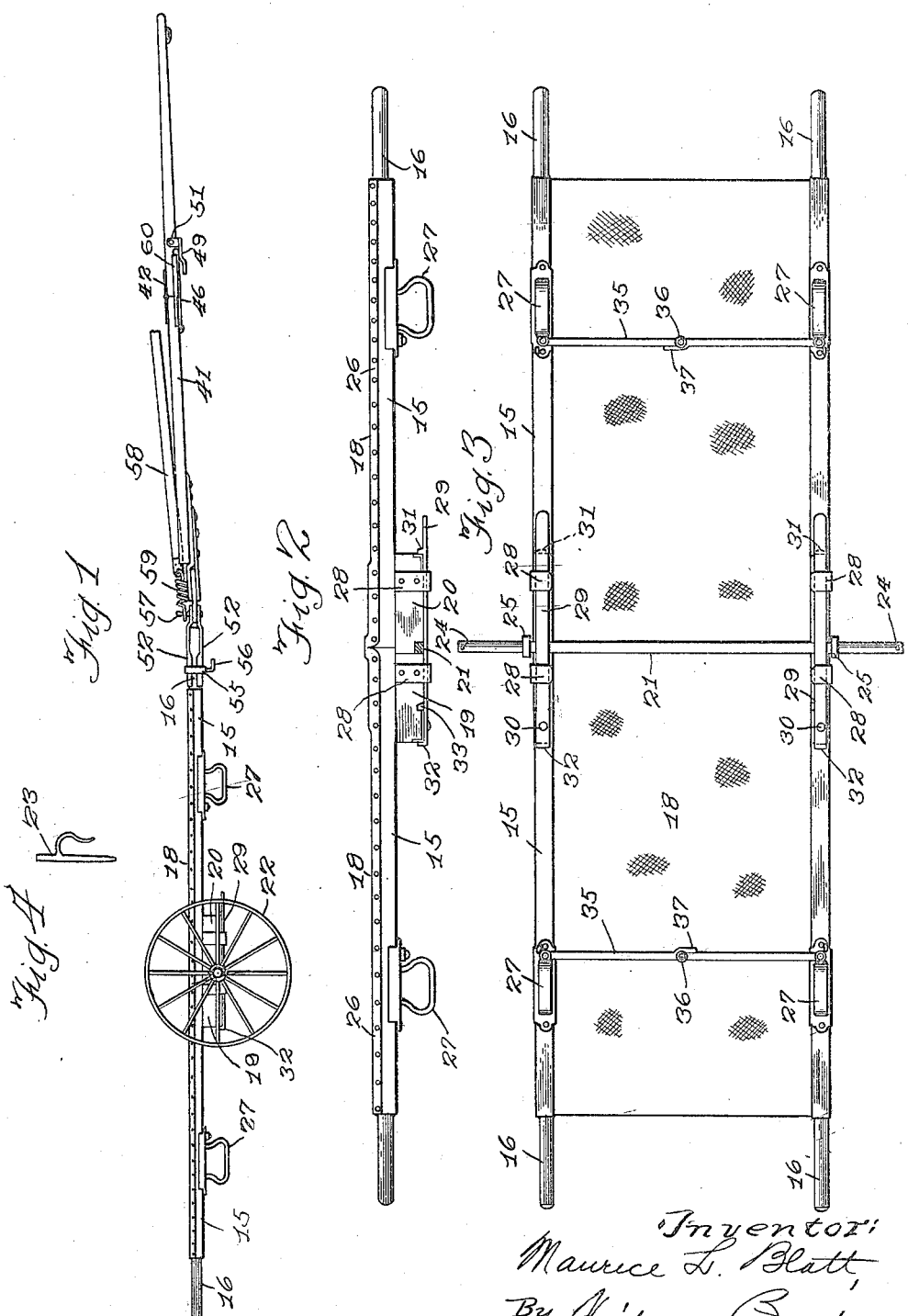

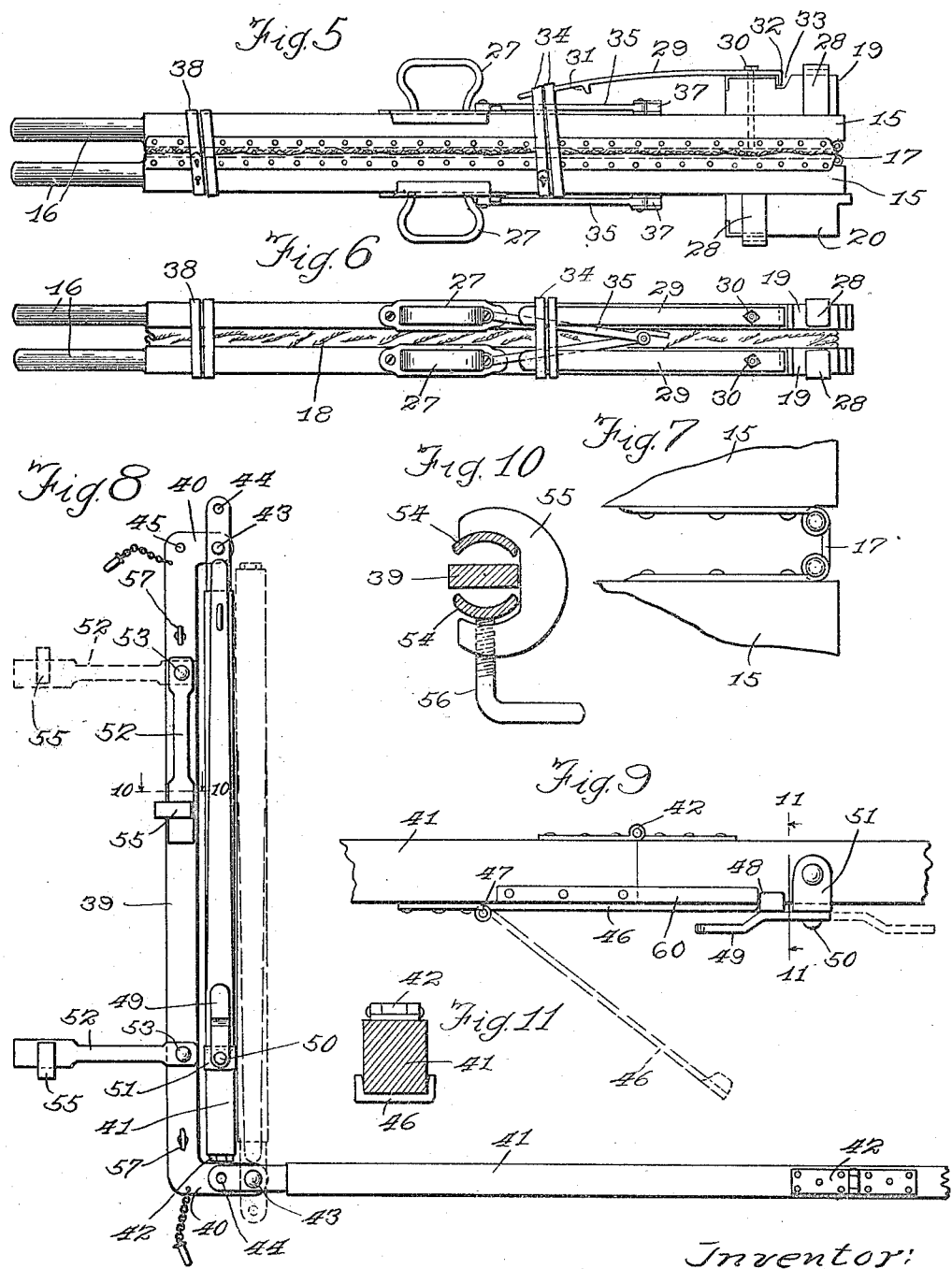

MAURICE L. BLATT, OF CHICAGO, ILLINOIS.

LITTER.

1,231,989.  Specification of Letters Patent.  Patented July 3, 1917.

Application filed September 18, 1915. Serial No. 51,451.

*To all whom it may concern:*

Be it known that I, MAURICE L. BLATT, a citizen of the United States, and resident of Chicago, in the county of Cook and State of Illinois, have invented certain new and useful Improvements in Litters, of which the following is a description, reference being had to the accompanying drawings, which form a part of my specification.

My invention relates to litters for carrying sick or wounded, being especially intended for military use and the like.

The object of the invention is to provide a litter capable of being easily folded or collapsed, and which may be readily transformed into a wheeled litter for the purpose of being transported or wheeled either manually by a single attendant, or drawn by a pack mule or draft animal.

Another object of my invention is to provide a litter which may be "knocked down" or collapsed into compact form so as to enable the entire construction being carried on the back of the pack mule or animal without protruding beyond certain predetermined points relative to the body of the animal, commensurate with safety in transportation.

The invention possesses certain other advantages inherent in the construction and which will be apparent from the following detailed description of the accompanying drawings, wherein:—

Figure 1 is a side elevation of my improved litter attached to the shafts employed when the litter is to be drawn by the pack mule or animal, the litter being shown in "set up" condition.

Fig. 2 is a side elevation of the litter proper with the draft mechanism or shafts and wheels removed.

Fig. 3 is a bottom plan of the construction shown in Fig. 2.

Fig. 4 is a detail view of a form of cotter or retaining pin for maintaining the wheels on the axle.

Fig. 5 is a side view of the litter shown in collapsed or folded condition.

Fig. 6 is a plan view of the construction shown in Fig. 5.

Fig. 7 is a detail view of the hinge employed on the litter frame.

Fig. 8 is a plan view of the draft mechanism adapted to be secured to the handles of the litter, as shown in Fig. 1; a portion or one side of the shafts being shown in folded position, while the folded position of the other side of the shafts is shown in dotted lines.

Fig. 9 is a detail view in side elevation of one of the shafts, illustrating the manner of locking the same in extended or "set up" position; the reinforcing or locking mechanism being also shown in dotted lines to indicate the manner in which said mechanism is moved when it is desired to collapse or fold the shaft.

Fig. 10 is a sectional view taken on the line 10—10 of Fig. 8, looking in the direction of the arrows.

Fig. 11 is a cross sectional view taken on the line 11—11 of Fig. 9, looking in the direction of the arrows.

The litter proper comprises the side frame members or rails 15, 15; the ends whereof terminate in the handle-portion 16.

Each rail 15 consists preferably of two sections or portions, preferably of substantially equal length, and secured together by means of a suitable hinge 17, see Fig. 7. The hinge 17 is preferably provided with the two pivotal connections illustrated in Fig. 7 so as to present the intermediate portion in order to maintain the portions or sections of the side rails at a sufficient distance apart to allow for the proper folding of the canvas or fabric portion 18, as very clearly shown in Fig. 5.

The hinges 17 (one hinge being employed on each side rail 15) are so secured to the sections or parts of the side rail 15 that the ends of the sections will abut against each other when the litter is unfolded into "set up" condition; it being understood that the hinges 17 are secured to the side rails so as to come intermediate of the folded sections, as shown in Figs. 5 and 7.

Secured to what may be termed the lower sides of the side rails 15, 15, and adjacent the hinged points thereof, are the reinforcing bearing members or axle blocks 19 and 20 which provide suitable holding members for the axle 21 on the ends whereof wheels 22 are intended to be mounted, see Figs. 1, 2 and 3. The wheels may be secured in place by any suitable means, as, for example, the cotter pin or member 23, shown in Fig. 4, which is intended to be inserted in the holes 24 in the ends of the axle, see Fig. 3. The axle 21 is preferably provided with the shoulders 25, 25, in order to maintain the wheels in proper position thereon and out of frictional contact with the side frames of the litter.

The canvas or fabric portion 18 of the litter is secured to the side frames 15 in the usual manner, being preferably held by means of the metallic strips 26, see Figs. 2 and 5; and the side rails 15 are also shown provided with the usual supports or rests 27 by which the litter is supported when the wheels are taken off the axle and the litter used in the ordinary manner.

The blocks 19 and 20 are preferably provided with the angle irons 28, 28 secured to the sides of the blocks so as to have one leg of the angle extend beneath the blocks and at a distance slightly removed therefrom in order to permit the insertion of the axle-locking bar 29 which is shown pivotally mounted at 30 on the blocks 19. The bars 29 are provided with lugs 31 and 32 which are adapted to engage with the outer ends of the blocks 19 and 20 when the litter is in "set up" condition, as illustrated in Fig. 2, thus further bracing the litter against collapsing, at which time the locking bars 29 have been swung on their pivotal points 30 from the position shown in Figs. 5 and 6 and into the position shown in Fig. 2, at which time the bars extend intermediate of the legs of the angle irons 28 and the blocks 19 and 20, thereby locking the litter in "set up" condition, as well as locking the axle 21 in place. In order to permit the locking bars 29 to swing into unlocking position, as indicated in Figs. 5 and 6, the blocks 19, on each side rail 15 of the litter, are shown provided with sockets 33, see Figs. 2 and 5, which is adapted to receive the lug 32 when the bar 29 has been swung into the position shown in Figs. 5 and 6. The bars 29 may be held in the unlocking position when the litter has been collapsed or knocked down by any suitable strap, as illustrated at 34 in Figs. 5 and 6.

The side rails 15, 15 of the litter are held in spaced relation to each other, when the litter is in "set up" condition, by the pivoted cross-bars 35, 35. The two cross-bars, as clearly shown in Fig. 3, each consist of two portions or sections pivotally secured at their outer ends to the respective side rails 15 of the litter, while the inner or adjacent ends are pivotally secured together at 36, as shown in Fig. 3. One of the members or portions of each cross bar is preferably provided with an overlapping lip, as at 37, which prevents the cross-bars collapsing in the opposite direction, namely beyond the alined or "dead center" position indicated in Fig. 3.

When the litter proper is collapsed or "knocked down," as shown in Figs. 5 and 6, the folded portions may be held together by any suitable means, as, for example, the straps 38, shown in Figs. 5 and 6.

In Fig. 8 I illustrate my improved collapsible draft mechanism which is adapted to be secured to the extended ends or handle-portions 16, 16 of the side rails 15 of the litter when it is intended to propel or draw the litter by means of a draft animal. The draft mechanism, as illustrated, comprises the cross-bar or swingle-tree member 39, preferably provided with angularly disposed ends 40, 40 to which are pivotally secured the collapsible shafts 41.

Each shaft 41 preferably consist of two portions or sections, as shown in Figs. 8 and 9, pivotally secured at abutting ends by means of a suitable hinge 42, shown in Figs. 8 and 9. The ends of the shafts 41 are pivotally secured at 43 to the angularly disposed ends 40, 40 of the swingle-tree member 39 in such manner as to permit the ends of the shafts to extend slightly beyond or rearward of the pivotal points 43, as indicated in Fig. 8, in order to permit the shafts being locked in "set up" position by inserting a suitable pin through the openings 44 and 45 of the shafts and swingletree members, respectively; these openings being brought into register with each other, when the device is "set up," as shown in the lower portion of Fig. 8 where one of the shafts is shown extended or opened out.

In order to permit the two shafts to be properly folded into collapsed condition, one of the ends 40 of the swingle-tree member 39 is preferably made slightly longer, namely the end shown in the lowermost part of Fig. 8. This method is preferably employed for the purpose of arranging the pivotal points 43 in an offset manner and thus permit one of the folded shafts to overlap the opposite folded shaft, as shown in dotted lines in Fig. 8. In this figure, one of the shafts 41 is shown in full lines in folded position while the other shaft is opened out and its folded position indicated by dotted lines.

In order to lock the two portions or sections of each shaft 41 in proper opened out or alined position, I preferably provide the underside of each shaft with a brace-bar 46, hingedly secured at 47 to one of the sections and arranged to extend beyond the joint of the two sections, as shown in Fig. 9; the free ends of the brace-bar 46 being provided with upwardly extending lips 48 adapted to engage with opposite sides of the shafts. The brace-bars 46 are locked in bracing position by means of a suitable lever 49 which is pivotally secured at 50 to the clip member 51 secured to the outer or free section of the shafts 41. It is apparent from the construction shown in Fig. 9 that when the brace-bar is moved to the position shown in full lines, and the lever 49 swung to the position also shown in full lines, the sections of the shafts will be firmly held in unfolded or extended position.

When it is desired to collapse the draft mechanism, lever 49 is swung about its pivotal point 50 into the position indicated in dotted lines, Fig. 9, thereby permitting brace-bar 46 to be moved about its pivotal point 47, as indicated in dotted lines; the brace-bar being permitted to fold against the inner section of the shafts so as to provide a compact construction when the mechanism has been collapsed. The main portions of the shafts may be constructed of wood or other suitable material possessing sufficient strength; the pivoted ends thereof are preferably formed of metal so as to give sufficient strength and compactness.

In order to brace the sections of shafts 41, against lateral movement, I prefer to secure metallic strips 60, to both sides of the inner or pivoted sections of the shafts, with the strips extending up flush with the lips 48 of bars 46, see Fig. 2; engagement with the lips 48 also preventing any sidewise movement of the free or outer sections of the shafts.

The swingle-tree member 39 is provided, at suitable points commensurate with the distance between the handles or ends 16, of the side rails of the litter when the latter is in "set up" position, with the attaching or socketed members 52, 52 preferably pivotally secured at 53 to the member 39. Each socket member 52 is shown as preferably consisting of separate portions secured to opposite sides of the swingle-tree member, as shown in Fig. 1; the ends of each portion being preferably shaped to conform with the shape or contour of the litter-handles, as shown at 54. The attaching members 52 are preferably made of metal possessing sufficient resiliency in order to permit their ends 54 to be clamped onto the ends 16 of the litter by means of suitable clips or jaws 55 which are adapted to extend partially about the ends 54, as shown in Fig. 10; the ends 54 being drawn together by means of the clip 55 and the screw-member 56 shown threaded through the lower portion of the clip 55 and arranged to engage with or press against the lower end 54 of the attaching members 52. It is evident from the construction in Fig. 10 that when screw-member 56 is turned in proper direction, its inner end will compel the two ends 54 to be drawn together and into clamping engagement with the ends or handles 16 of the side rails of the litter.

The arrangement of the clips or jaws 55, as well as the construction of the attaching members 52, each of which consist of an upper and lower portion, as can more clearly be seen in Fig. 1, permits the attaching members 52 to be swung about the pivotal points 53 into a position parallel with the swingle-tree member 39 so as to bring both portions of the attaching members 52 above and beneath the swingle-tree member 39, as shown in the sectional view, Fig. 10, taken on the line 10, 10 of Fig. 8, where one of the attaching members is shown in a folded position while the other attaching member is shown swung out into position to receive the ends of the litter rails.

The swingle-tree member 39 is shown provided with suitable attaching clips 57, 57 to receive the ends of the traces 58, as shown in Fig. 1; although any suitable means for attaching the traces may be employed. I prefer to provide shock absorbing springs 59 whereby the traces 58 are secured to the clips 57, thus relieving the litter from the jerking action which would otherwise be encountered through movement of the draft animal.

As is evident from the construction shown and described, both the litter and the draft-mechanism may be folded into such compact form as to permit the entire construction being carried on the back of the pack-mule or draft animal without extending forward beyond predetermined points commensurate with safety.

As more clearly shown in Fig. 2, the blocks 20 are preferably shown provided with a portion extending beyond the hinged or breaking point of the litter rails 15, so as to not only provide a suitable socket for the axle 21 at a point preferably substantially at a central point between the ends of the litter, but also provide a reinforcing point beneath the hinged point of the rails; the overhanging or extended portion of blocks 20 resting on the axle,—which is locked in place—will prevent collapsing action of the side rails.

I have shown and described what I believe the simplest and best form of my construction, but it is evident that certain details may be altered in minor respects without, however, departing from the spirit of my invention, and I do not wish to be understood, therefore, as limiting myself to the exact construction shown and described.

What I claim is:—

1. A litter comprising sectional side rails, the sections of the respective rails being hingedly secured together so as to permit the sections of the same rail to fold upon each other, reinforcing blocks secured to both sections of said rails adjacent the hinged connections thereof, means whereby the side rails are held in spaced relation with each other, said means being adapted to collapse intermediate of the side rails, means pivoted to one of the blocks so as to adapt one end to be moved into juxtaposition with the other correlated block, and means secured to the last mentioned block adapted to lock the free end of said first mentioned means in place and maintain the rail-sections in "set up" position.

2. A litter of the class described, comprising a pair of sectional side rails, the sections of the respective rails being hinged together so as to permit folding on each other, said hinged connections being provided with a plurality of pivotal points so as to provide an intermediate link adapted to maintain the sections of the rails spaced apart when in "knocked down" position, collapsible means whereby the side rails are held in spaced relation, and means pivotally secured to one of the sections of each side rail and located adjacent the hinged connections of the respective sections and on the opposite sides of said rails, said means being adapted to be swung into locking engagement with the adjacent rail-section whereby the rail-sections are locked in "set up" condition.

3. A litter of the class described, comprising a pair of sectional side rails, the sections of the respective rails being hinged together so as to permit folding on each other, bearing members secured to each side rail, an axle adapted to seat in said members and extending transversely of the litter, wheels removably mounted on said axle, and means secured to each side rail and in juxtaposition with said members, said means being adapted to lock the axle in said members and hold the sectional side rails in "set up" position.

4. A litter of the class described, comprising a pair of sectional side rails, the sections of the respective rails being hinged together so as to permit them to fold on each other, a sectional bearing member secured to each side rail at points coincident with the hinged connections of the latter, one section of said members being secured to each section of the side rails, an axle adapted to be held intermediate of the sections of said members when the latter are in "set up" position, and means adapted to lock the axle in said bearing members and to hold the sectional side rails in "set up" position.

5. A litter of the class described, comprising a pair of sectional side rails, the sections of the respective rails being hinged together so as to permit them to fold on each other, bearing members secured to each side rail, an axle adapted to seat in said members and extend transversely of the litter, wheels removably mounted on said axle, and a lock bar secured to each side rail in juxtaposition with said members and adapted to lock said axle in place and hold the sectional side rails in "set up" position.

6. A litter comprising a pair of sectional side rails hinged together so as to permit the sections to fold on each other, sectional reinforcing members secured to the side rails at points coincident with the hinged connections of the latter and adapted to abut against each other, with the abutting ends thereof rabbetted, an angularly bent member secured to each section of said members so as to have the free ends thereof extend beneath the sectional members, an axle adapted to seat in the rabbet of the sectional members, and lock-bars adapted to extend across the sections and intermediate of the members and the free ends of the angularly bent members whereby the axle is locked in place and the side rails held in "set up" position.

7. A litter of the class described, comprising a pair of sectional side rails hinged together so as to permit the sections to fold on each other, sectional members secured to the side rails at points coincident with the hinged connections of the latter and adapted to abut against each other, the abutting ends thereof being provided with a rabbet, an angularly bent member secured to each section of said members so as to have the free ends thereof extend beneath the sectional members, an axle adapted to seat in the rabbet of the sectional members, and a lock-bar pivotally secured to one of the sections of each sectional member and provided with upwardly presented lugs adapted to engage the outer ends of both sections of the sectional members, said lock-bars being adapted to extend across the bottom of the sections intermediate of the sectional members and the free ends of the angularly bent members whereby the axle is locked in place and the side rails held in "set up" position.

MAURICE L. BLATT.

Witnesses:
G. HEIDMAN,
F. A. FLORELL.

Copies of this patent may be obtained for five cents each, by addressing the "Commissioner of Patents, Washington, D. C."